United States Patent [19]

Carlo et al.

[11] Patent Number: 5,278,537

[45] Date of Patent: Jan. 11, 1994

[54] ELECTRONIC ALARM FOR AVOIDING COLLISION WITH ANIMALS IN A NON-DESTRUCTIVE MANNER

[75] Inventors: Louis D. Carlo, Litchfield, Ohio; Michael J. Shives, Hagerstown, Md.; Jon E. Garner, Purcellville, Va.

[73] Assignee: Winner International Corporation, Sharon, Pa.

[21] Appl. No.: 919,248

[22] Filed: Jul. 27, 1992

[51] Int. Cl.⁵ ............................................. G08B 3/00
[52] U.S. Cl. ............................... 340/384.1; 116/22 A; 367/139
[58] Field of Search ...................... 340/425.5, 904, 384; 367/139; 116/22

[56] References Cited

U.S. PATENT DOCUMENTS

| | | | |
|---|---|---|---|
| 3,516,384 | 6/1970 | Will | 340/406 |
| 3,872,472 | 3/1975 | Moschgat | 340/384 E |
| 3,890,612 | 6/1975 | Sweany et al. | 340/384 E |
| 3,893,106 | 7/1975 | Schulein | 340/384 R |
| 4,091,383 | 5/1978 | Rainville | 340/384 R |
| 4,104,610 | 8/1978 | Inoue et al. | |
| 4,338,593 | 7/1982 | Mills | 340/384 R |
| 4,374,377 | 2/1983 | Saito et al. | 340/384 E |
| 4,437,428 | 3/1984 | Hoffelner | 116/137 R |
| 4,562,561 | 12/1985 | Ackley | 367/139 |
| 4,626,799 | 12/1986 | Matievic | 340/384 E |
| 4,633,215 | 12/1986 | Anders et al. | |
| 4,769,794 | 9/1988 | Beuter et al. | 367/139 |
| 4,903,630 | 2/1990 | Rezmer | 116/22 A |
| 4,933,918 | 6/1990 | Landsrath et al. | 367/139 |
| 4,998,091 | 3/1991 | Rezmer | 340/384 E |

FOREIGN PATENT DOCUMENTS 8602526 5/1986 PCT Int'l Appl. ................. 367/139

*Primary Examiner*—Brent Swarthout
*Attorney, Agent, or Firm*—Body, Vickers & Daniels

[57] ABSTRACT

An electronic alarm is disclosed for use in a moving vehicle which generates ultrasonic sound for preventing animals from moving into the path of the vehicle. The device includes a simplified driver circuit for generating electrical impulses in the form of square waves having constant peak-to-peak voltages. The driver generates the square waves with periodic, sequentially increasing wave frequencies followed by sequentially decreasing wave frequencies. A coupling transformer converts the square waves into electrical sine wave voltages having high peak-to-peak voltages to cause a piezo-electric transducer to emit intense, ultrasonic sounds of periodically increasing frequencies followed by periodically decreasing frequencies simulating the warble effect of a siren without excessive heating and premature failure of the transducer. The ultrasonic warble effect confuses the animal to prevent inadvertent movement by the animal into the oncoming vehicle's path without injury to the animal.

36 Claims, 3 Drawing Sheets

ELECTRONIC ALARM FOR AVOIDING COLLISION WITH ANIMALS IN A NON-DESTRUCTIVE MANNER

This invention relates generally to devices which are used to disperse animals and more particularly to devices which generate sound to disperse animals in a non-destructive manner.

The invention is particularly applicable to and will be described with specific reference to an electronic audio alarm mounted in a vehicle which is effective upon actuation to confuse and disperse animals so that automotive collisions caused by animals running into the path of a moving vehicle are avoided without injury to the animal. However, the invention need not necessarily be limited to moving vehicles and could be installed in stationary objects such as tents or the like or function as perimeter fences to avoid animal intrusion into a defined area.

BACKGROUND

There are countless instances where animals have wandered into spaces or areas occupied by humans or vice versa with devastating consequences to the animal or to the human. It should suffice to simply reflect on the number of animal carcasses littering highways as a result of the animal running or darting into the path of a moving vehicle. This is perhaps the most common example and it is this problem to which the present invention principally relates. However, there are other applications. Hunters and campers can be intruded upon by animals wandering into their tents or campsites. In an urban setting, postmen and metermen traditionally encounter threatening animals in their work. Still further, farmers and ranchers have need to set aside certain areas where unwanted animal intrusion does not occur.

The prior art has recognized this problem and certain devices have been produced which relate generally to the subject matter of the present invention. It is known that animals, or at least many animals, can detect ultrasonic sound waves and use the ultrasonic sound waves to detect the source of the sound. Conceptually this is illustrated in FIG. 1 by an object 1 emitting an ultrasonic sound wave designated by reference numeral 2 at a given frequency which animal 3 hears. Ultrasound wave 2 includes waves 2a and 2b which reflect or bounce off stationary objects such as trees 4a and 4b and are reflected as shown to the ears of animal 3. Animal 3 is believed to discern the time lag resulting from the increased reflective distances of waves 2a, 2b to locate the position of object 1.

Utilizing this concept, mechanical devices have been proposed which generate ultrasonic sounds which vary in frequency. Because the ultrasonic sounds vary in frequency or alternatively stated, vary in wave length, the animal is believed to try to locate the sound by attempting to discern the time lag resulting from non-existent reflective waves, which "time lag" results from the varying frequencies of the ultrasonic sounds emitted by the mechanical device. The animal thus becomes confused while it tries to spatially reconstruct the position from which the sound emanates. Tests have shown that the animal is dispersed or leaves the vicinity from which the sound emanates because it is confused. In any event, the animal does not inadvertently move towards the sound. Significantly, the animal is not injured by the ultrasonic sound waves nor is its hearing impaired.

One mechanical device operating on this principle is currently available under the brand name of DAZZLER. The device is mechanical and adapted for handheld applications, specifically one in which a postman or a meterman would use the device to ward off a dog attack. However, the ability of any mechanical device to generate consistent, repeatable sounds in an intense manner is limited. The durability of any mechanical device is questionable. Significantly, devices which mechanically produce sound waves have inherent limitations in their ability to precisely produce closely controlled sound waves. As of the date of this application, tests are still being conducted on such devices including that of the present invention. It is possible that close control of the wavelenths of the ultrasonic wave becomes much more critical in an application where a moving object, i.e., an automobile, is involved than that involving a standing or slow-moving object.

SUMMARY OF THE INVENTION

Accordingly, it is a principal object of the present invention to provide an electronic device or alarm which can consistently and repeatedly produce ultrasonic sounds in a sequenced varying manner to confuse, disorient or disperse animals without injury thereto.

This object along with other features of the invention is achieved, generally, in a device for dispersing in a non-destructive manner, animals capable of hearing sounds at ultrasonic frequencies, which device includes a sound transducer operable to generate sounds at ultrasonic frequencies, and an electrical mechanism or circuit actuated by an electrical power source for causing the transducer to generate, in a periodically repeating manner, pluralities of first and second sequenced sound waves with varying, ultrasonic frequencies whereby an ultrasonic warble effect of a siren is generated by the transducer to confuse and disperse the animal.

In accordance with another aspect of the invention, a motor vehicle is provided with an anti-collision, ultrasonic sounding alarm preventing animals who are capable of detecting ultrasonic sounds from colliding with the motor vehicle. The alarm includes a source of electrical power from the motor vehicle, i.e., its battery, and an electrical driver mechanism or circuit for converting the electrical power into a plurality of electrical pulses having voltage wave forms of sequenced, varying frequencies. A piezo-electric transducer mechanism receives the electrical pulses in the sequential manner in which they are generated and in response thereto generates ultrasonic sound waves at the varying frequencies of the sequenced, electrical waves so that the ultrasonic sound waves are variably sequenced to simulate the warble effect of a siren whereby the animal, hearing the ultrasonic siren simulated sound, becomes confused and disoriented.

In accordance with yet another aspect of the invention, a device is provided for use in a motor vehicle to disperse, without injury, animals capable of hearing ultrasonic sounds and the device includes a driver mechanism or circuit for sequentially generating first and second pluralities of electrical pulses in predetermined wave forms of varying frequency, a coupling transformer receiving at its primary the sequentially generated first and second pluralities of electrical waves, a capacitor in parallel with the secondary of the transformer and a piezo-electric transducer in parallel with the transformer and capacitor for sequentially generating first and second pluralities of varying ultrasonic sounds correlated in wave lengths to the first and second pluralities of electrical waves so that the transducer generates periodically repeating different ultrasonic sounds in the warble effect of a siren to confuse and disorient the animal whereby collision between the animal and the motor vehicle is avoided.

In accordance with a more specific feature of the invention, the transformer generates a constant peak-to-peak voltage as a continuous sine wave which is applied to the piezo-electric transducer to permit the transducer to emit sound levels at intensities which are higher than that possible with other wave forms without the transducer overheating and prematurely failing.

In accordance with yet another specific aspect of the invention, the driver utilizes a Class "C", low-duty cycle operational amplifier or transistor which generates less heat than amplifiers operating in a Class "A" or Class "B" cycle (and thus requires a smaller heat sink) while reducing the number of components in the circuit and eliminating the need for a sine wave shaping circuit which would otherwise be required to drive the piezo-electric transducer.

In accordance with a specific, important feature of the invention, the driver includes a microprocessor for generating a plurality of electrical waves of continuously varying frequency and a timing mechanism or circuit operable in conjunction with the microprocessor for periodically changing the sequence of the varying frequencies from one where the frequencies increase over a discrete time period to one where the frequencies decrease. Specifically, the timing mechanism operates to cause the microprocessor to generate a series of electrical pulse waves which sequentially increase in frequency from about 19 to about 24 kHz. and sequentially decrease in frequency from about 24 to about 19 kHz. with the timing mechanism causing the microprocessor to switch the generation of the electrical waves from increasing to decreasing frequencies at about every 200 milliseconds so that a precise, durable and consistently repeatable, inexpensive circuit is provided for electrically driving the transducer.

In accordance with a more specific but important feature of the invention, the driver circuit generates voltages in square wave form at varying frequencies which is amplified by a transistor operating in a Class "C" cycle to significantly boost the power inputted to the transducer in an inexpensive circuit and, the square wave voltage is transformed into a continuous sine wave voltage of varying frequencies with constant peak-to-peak voltage by the coupling transformer without the necessity of a separate wave forming circuit.

In accordance with yet another aspect of the invention, a method for preventing animals from running into the path of a moving vehicle is provided which includes the steps of providing an electronic driver powered by the vehicle's battery for generating a first plurality of voltage wave forms having increasing frequencies followed by a second plurality of voltage wave forms having decreasing frequencies; providing the vehicle with a piezo-electric transducer capable of producing ultrasonic sounds and inputting the voltage wave forms to the transducer to cause the transducer to emit a first plurality of ultrasonic sounds sequenced with increasing frequency followed by a second plurality of ultrasonic sounds sequenced with decreasing frequency whereby the warble effect of a siren is simulated to cause the animal to avoid moving into the path of the vehicle.

In accordance with other features of the invention, the driver circuit includes a low-voltage detector circuit which disarms the device if the vehicle's battery is discharged or low. The driver circuit also includes a motion detector device which senses vibrations imparted to the vehicle when its engine is operating so that the alarm is only actuated when the vehicle is in motion or its engine running. Finally, an inexpensive light emitting diode is provided to indicate to the vehicle operator when the piezo-electric transducer is in operation.

It is thus one of the objects of the invention to provide an electronic device which consistently and repeatedly generates varying ultrasonic sounds in the warble effect of a siren.

It is yet another object of the invention to provide a device which has the ability to accurately and precisely generate ultrasonic sounds at closely controlled intensities and closely controlled frequencies.

It is yet another object of the invention to provide an ultrasonic sound alarm in a vehicle which, upon actuation, is effective to prevent animals from running into the path of the vehicle when moving.

It is yet another object of the invention to provide an electronic device for generating ultrasonic sounds in the warble effect of a siren which utilizes a minimum number of circuits with each circuit utilizing a minimum number of electrical components to provide an inexpensive alarm.

A still further object of the invention is to provide a simplified, inexpensive animal alarm sounding circuit which provides significant amplification of electrical voltage to drive a piezo-electric transducer to its maximum intensity.

Still yet another object of the invention is to provide in a nondestructive animal dispersing device utilizing ultrasonic sound waves, a simple, inexpensive sine wave generator permitting the piezo-electric ultrasonic sound wave transducer to operate at significantly higher intensities without over-heating and premature failure.

A still further object of the invention is to provide a method for preventing animals from moving into the path of an oncoming vehicle without injury to the animal.

These and other objects of the invention will become apparent to those skilled in the art upon reading and understanding the detailed description of the invention set forth below.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE PREFERRED EMBODIMENT

Figure 1:
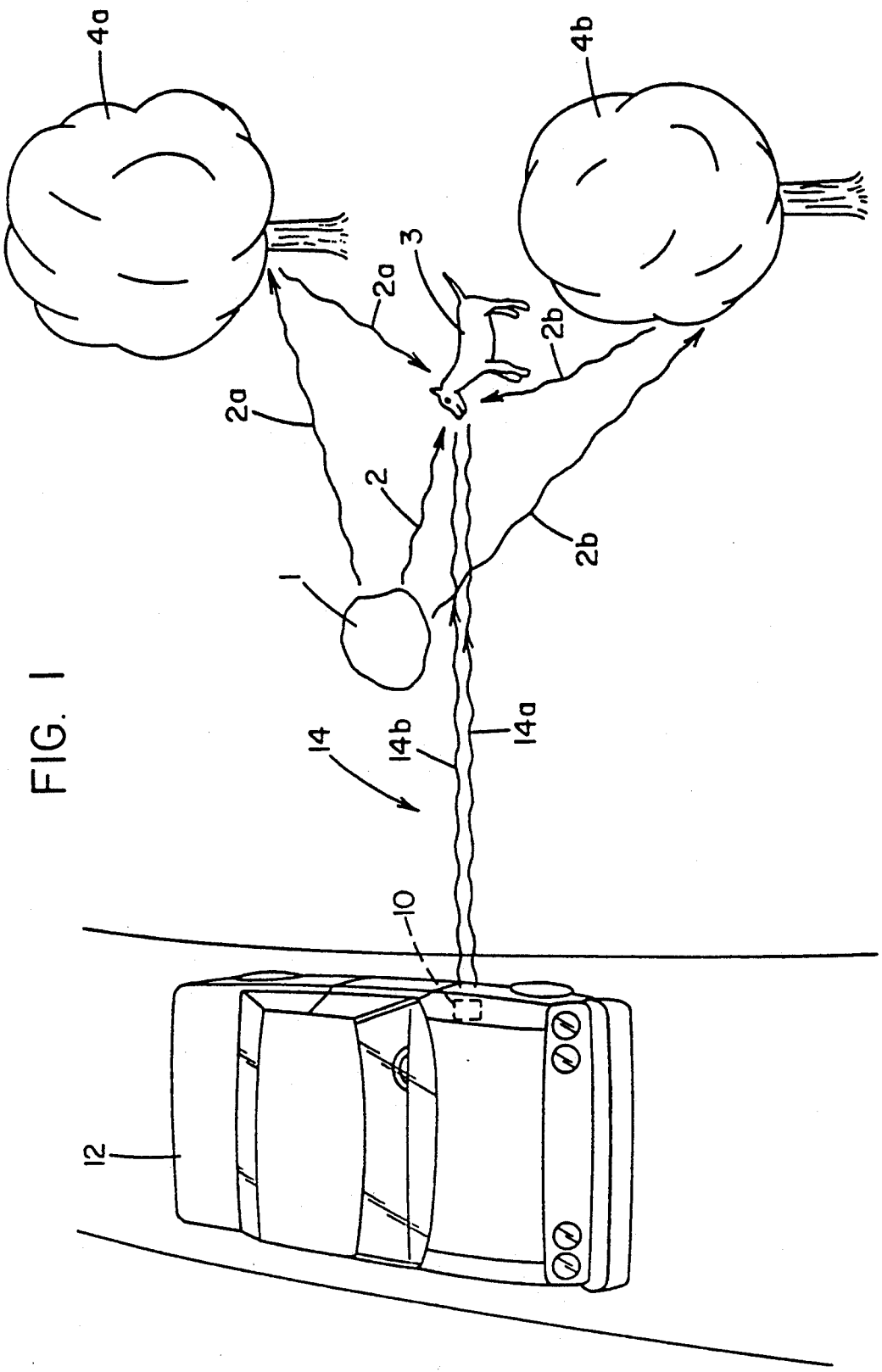
FIG. 1 a diagrammatic, pictorial illustration of sound wave transmission in the environment of the present invention.

Referring now to the drawings wherein the showings are for the purposes of illustrating a preferred embodiment of the invention only and not for the purposes of limiting the same, there is shown in FIG. 1 an audio alarm 10 marketed under its brand name ANIMAL LOVER which is mounted in a moving vehicle 12. Alarm 10 emits ultrasonic sounds of generally constant intensity but of varying frequency. More specifically, the ultrasonic sound waves generated by alarm 10 have wave forms which increase in frequency for a discrete period of time after which the wave forms decrease in frequency for a similar discrete period of time. Diagrammatically, the ultrasonic sound is indicated by reference numeral 14 in FIG. 1 and the ultrasonic sound wave when increasing in frequency is indicated by reference numeral 14a in FIG. 1 while the ultrasonic sound wave when decreasing in frequency is indicated by reference numeral 14b in FIG. 1, although it should be clear that one sound comprised of a multitude of sound waves of varying frequency is produced by alarm 10. Because sound wave 14 is increasing and decreasing in wave frequency or wave length, the wave can be analogized to that of a warble effect produced by a siren. As indicated in the Background above when animal 3 is subjected to this warble effect, especially when the varying frequency sound wave is reflected off stationary objects such as trees, 4a, 4b, animal 3 is no longer able to discern the "time lag" and becomes confused and disoriented. It moves away from the source of the sound until the intensity of the sound diminishes. One thing is clear. The animal does not continue to move towards the sound because the intensity of the sound increases as the animal moves closer to the source of the sound.

Figure 5:
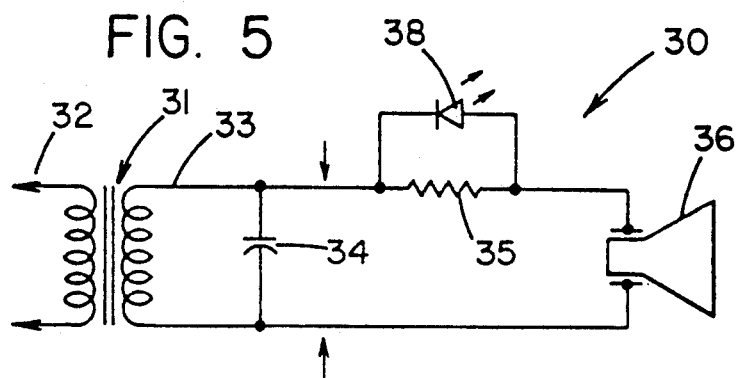
FIG. 5 is an electrical, schematic drawing of another portion of the circuit of the present invention, specifically, the piezo-electric transducer's electrical circuit.
Figure 4:
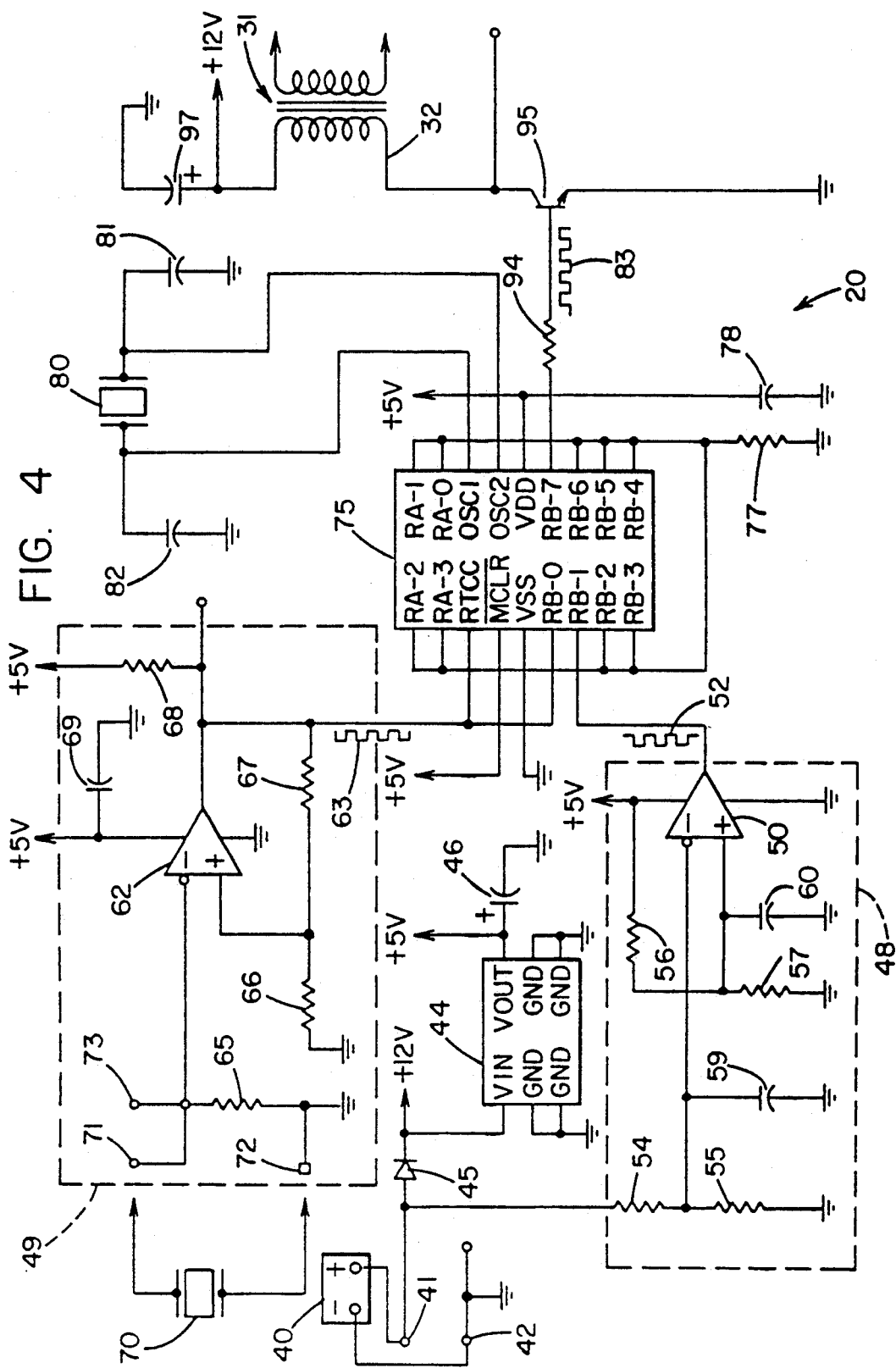
FIG. 4 is an electrical schematic drawing illustrating a portion of the circuitry used in the electronic device of the invention.

The circuit employed in the preferred embodiment of alarm 10 is diagrammatically shown in FIGS. 4 and 5 which are to be understood to be conventional wiring diagrams. FIG. 4 principally illustrates the driver circuit or driver means or driver 20 while FIG. 5 illustrates the transducer circuit or transducer means generally indicated by reference numeral 30. It is to be understood that the circuits described are effected on a printed circuit board (not shown) with the electrical components soldered or wired into the circuit board in conventional manner. Thus the alarm 10 can be viewed as physically comprising a simple box containing a printed circuit board and an ultrasonic microphone or transducer either physically affixed to the box or remotely wired thereto with power to the board supplied from the vehicle's battery.

A.) The Transducer Circuit

Referring first to FIG. 5, there is shown transducer circuit 30 which includes a coupling transformer 31, a capacitor 34 in parallel with transformer 31, a load resistor 35 in series with transformer 31 and an ultrasonic piezo-electric transducer 36 in parallel with capacitor 34 and transformer 31. Finally, a light emitting diode 38 is in parallel with resistor 35 to indicate to the operator of motor vehicle 12 that alarm 10 is operational. Set forth below in tabular form is a listing of each electrical component shown in FIGS. 4 and 5, by description, part number and the source from which the component can be purchased.

Insofar as transducer circuit 30 has been described, it is to be understood that input to the primary side 32 of transformer 31 is a voltage in the form of square waves with varying frequencies which periodically increase and decrease. Transformer 31 converts at its secondary 33 the voltage from a square wave form to a sinusoidal wave form. Because the time at which transducer 36 is exposed to electrical voltage at the maximum voltage of a sinusoidal wave (which is 40 volts in the preferred embodiment) is less than that at which the transducer would be exposed to the maximum voltage of a square voltage wave, the transducer can be exposed to significantly higher voltage or electrical pulses in sinusoidal wave form to emit more intense sounds without overheating and prematurely failing which would otherwise occur (for the same sized transducer) with a square wave or similarly shaped voltage wave form. One skilled in the art will readily recognize that other wave forms could also be employed to generate short time durations of peak voltage to similarly drive transducer 36 without overheating transducer 36 and such other wave forms fall within the broad concept of the invention disclosed herein. However, it is a specific inventive feature of the invention to use a sinusoidal voltage wave form because a) no special wave generating circuit is required as the sine wave results from transformer 31 and/or b) for sound generation, the smooth shape of the sinusoidal node is preferred. It is to be understood that the peak-to-peak voltage of the square wave at the transformer's primary 30 is constant and the peak-to-peak sinusoidal wave voltage at the transformer's secondary 33 is also constant. It has been found that ceramic speakers, i.e., 1.5" direct radiating tweeters, available from Motorola as Model Nos. KSN 1075A, 1076A, 1101A, have excellent response level in the ultrasonic frequency range and function well as piezo-electric transducer 36. For definitional purposes a wave will be considered ultrasonic if its frequency is at least 18-20 Khz.

Also, it should be noted that the sizing of capacitor 34 and resistor 35 is selected to be at resonance at the midpoint frequency of the voltage sine waves in transducer circuit 30. That is, in the preferred embodiment, it has been found that, sine wave frequency should optimally vary in a sequenced frequency between 21 and 24 kHz. so that the components of transducer 30 are sized or tuned to be at an optimal response time or resonance at 23 kHz.

B. The Driver

The electrical schematic diagram for driver 24 is illustrated in FIG. 4 and is to be understood that solid nodes shown in the drawing represent line connections and connections to the printed circuit board which is conventional. In addition, some of the lines which will not be numbered nor described herein other than that they are shown in the drawings are thin track and function as fuses in a conventional manner. All components of the circuits disclosed in FIGS. 4 and 5 will be given a reference numeral and, for the preferred embodiment, will be specifically identified in tabular form below. In the interest of brevity, the description of the operation of some components disclosed in the circuit will not be discussed because it is believed that the operation of the components, once identified below and taken in connection with the drawing will be readily apparent or obvious to an ordinary artisan.

The vehicle's battery (which obviously includes the alternator—not shown) is schematically shown at reference numeral 40 and provides power to driver 20 at contacts 41, 42 with one of the contacts connected to earth-ground. (All other earth-grounds are shown in the drawing.) All components used in the circuit are conventional. Voltage in is at 12 volts and biasing voltage is at 5 volts.

Power for the circuit board from battery 40 is provided by a positive voltage regulator 44 in an arrangement as shown which includes diode 45 and capacitor 46.

There are two square wave generators, each employing operational amplifier circuits. One square wave generator is shown contained within dash lines indicated by reference numeral 48 and functions as a crank detector to generate the base square wave diagrammatically shown by reference numeral 52 so long as battery 40 is not discharged, i.e., low-voltage detector. The other operational amplifier circuit is a vibration detector circuit and is contained within dash lines indicated by reference numeral 49. Vibration detector circuit 49 likewise generates a square wave designated by reference numeral 63 provided that vibrations from the engine of motor vehicle 12 are sensed. In other words, if motor vehicle's engine is running, vibration detector circuit 49 is operational and generates the square wave schematically shown to permit operation of alarm 10. Both crank detector circuit 48 and vibration detector circuit 49 employ operational amplifiers operating in a Class "C" cycle or operation.

Class "C" amplifier cycle is used in its classic, conventionally defined sense. It means that the quiescent operating point or Q point on the DC load line of the amplifiers characteristic curves (collector current on the Y axis and collector-to-emitter voltage on the X axis) is below the cut-off point (the X axis) of the load line. While "Class C" amplifiers do introduce significant amplitude distortion, collector-to-emitter voltage is increased to provide maximum voltage or power to transducer circuit 30. Inherent in the "Class C" amplifier cycle is that the amplifier or transistor is cooler running than that which would occur in a typical "Class A" or "Class B" or "Class A-B" operational amplifier cycle which would generate a substantially higher heat output and thus require a larger heat sink. Also the other operational cycles ("A", "B", "A-B") would have more parts and would require a sine wave shaping circuit in order to drive piezo-electric transducer 36 to its maximum or highest sound output.

Crank detector circuit 48 has an inverting operational amplifier 50 with components arranged as shown to generate a voltage in square wave shape or form with constant peak-to-peak voltages as schematically indicated by reference numeral 52. Components in crank detectors circuit 48 include resistors 54, 55, 56 and 57 and capacitors 59 and 60 connected to form a circuit as shown.

Vibration detector circuit 49 similarly employs an inverting operational amplifier 62 and electrical components to generate a square wave with constant peak-to-peak voltage schematically indicated by reference numeral 63. The components include resistors 65, 66, 67, and 68 and a capacitor 69 in the amplifier's biasing voltage connected in the circuit as shown. In addition, in series with resistor 65 is a motion sensor 70 connected to contacts 71, 72 as shown and motion sensor 70 must be actuated by motion experienced by vehicle 12 to allow current to pass in vibration detector circuit 49. Voltage in for vibration detector circuit 49 is at contacts 71, 73.

As shown, square waves 52, 63 are inputted into a conventional, 8-bit CMOS microprocessor 75. For reference purposes, microprocessor 75 has 18 pins with pin number 1 correlated to RA-2, pin 9 correlated to RB-3, pin 10 correlated to RB-4 and pin 18 correlated to RA-1 as shown in FIG. 4. Output of microprocessor is at the pin correlated to RB-7. Also, connected to microprocessor 75 is a resistor 77 and a capacitor 78 both of which are connected to earth ground. Also connected to microprocessor 75 is a timing mechanism or timing circuit. The timing circuit includes a 4.0 MHz. resonator 80 and first and second capacitors 81, 82.

The software built into microprocessor 75 multiplies and/or divides the incoming square wave so that its frequency or wave length is sequentially increased or decreased and resonator 80 in combination with first and second capacitors 81, 82 acts to switch microprocessor 75 from increasing the wave frequency to decreasing the wave frequency and from decreasing the frequency to increasing the frequency at discrete time periods i.e., shift times T1. That is as one capacitor, say first capacitor 81 is charged, the other capacitor, second capacitor 82 is discharged so that microprocessor software is increasing the frequency and when resonator 80, timed at 4 MHz., switches the charging and discharging function of first and second capacitors 81, 82, microprocessor 75 acts to decreases the frequency or wave length of the square pulses emitted at RB-7 which are shown schematically in FIG. 4 as reference numeral 83.

Figure 2:
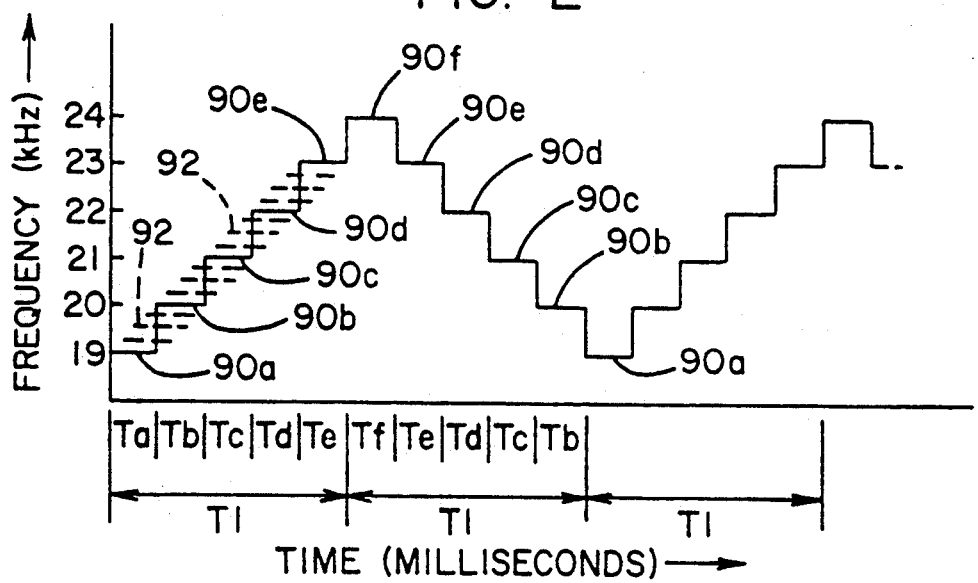
FIG. 2 is a schematic graph of frequency versus time showing sine wave voltages generated during operation of the invention.
Figure 3:
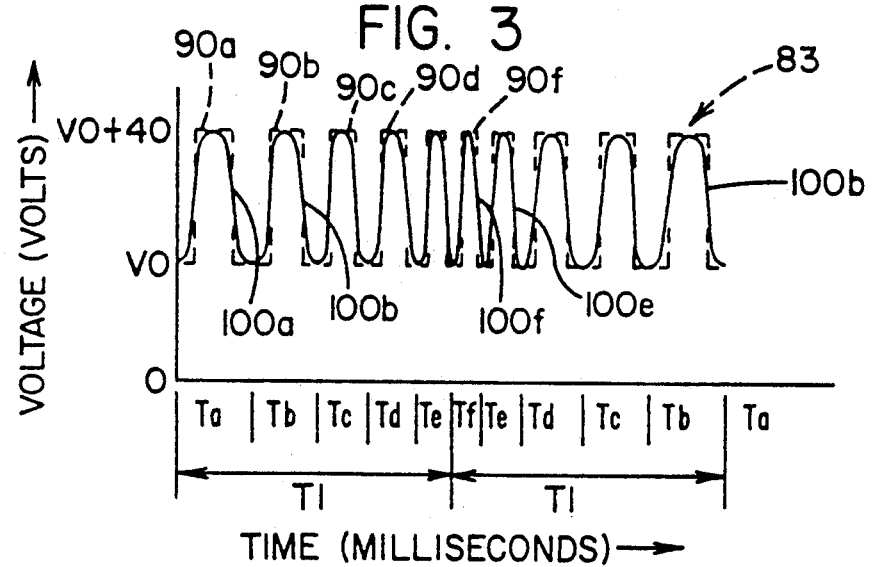
FIG. 3 is a schematic graph of voltage versus time depicting the sine wave voltages generated during operation of the invention.

Schematically, and in a general sense, the shape of the voltage wave forms is indicated in FIGS. 2 and 3. Conceptually, microprocessor 75 outputs a first square voltage wave form which in one version of the preferred embodiment has a frequency of 19 kHz. and which is schematically shown in FIG. 2 by reference numeral 90a. The microprocessor software then generates the second square wave form at a frequency of 20 kHz. shown as reference numeral 90b. During the iterative time (shown as Ta, Tb.Tc, etc.) it takes microprocessor 75 to complete its mathematical functions to sequentially step the frequency (or alternative the wave length) of the voltage wave form to its next higher frequency voltage wave, it will be assumed that a plurality of waves occur at the set frequency. Because the wave length changes with frequency, more voltage wave forms will be produced during the iterative time periods (Ta, Tb, etc.), which in FIG. 2 is shown as constant, as the frequency is sequentially stepped to higher values. The microprocessor continues its iterative function to sequentially step or increase the frequency of the voltage square wave until square wave form 90f is generated at a frequency of 24 kHz. The timing circuit through resonator 80 and capacitors 81, 82 then forces the logic to reverse itself to produce wave forms descending in frequency, i.e., 90e, 90d, 90c, 90b until 90a repeats at which time microprocessor 75 is shifted again through the timing circuit. The shift times are schematically illustrated in FIGS. 2 and 3 and are designated T1 and are shown as being equal in time duration so that the warble effect of a siren is produced. In the preferred embodiment, a shift time T1 of 200 milliseconds for resonator 80, capacitors 81, 82 and microprocessor 75 has given good results.

In reality, there may be a plurality of varying wave forms generated (and which are indicated by dash lines 92 in FIG. 2) between the time wave form 90a is produced and wave form 90b is produced. In other words, during the iterative time period Ta, Tb, Tc etc. that it takes microprocessor to complete its mathematical functions and change the frequency of the wave form a plurality of waves at a fixed frequency can occur, or alternatively, during the iterative time periods, Ta, Tb, Tc, Td, etc., a plurality of wave forms 92 of varying frequency can occur depending on the microprocessor. In either instance, the concept is the same. A microprocessor in combination with a timing circuit is used to perform iterative functions to sequentially step the frequency of the voltage waves towards higher frequencies or shorter wave lengths and then reverse to lower frequencies or longer wave lengths after a plurality of iterative time steps have occurred during a predetermined discrete shift time period. In the broad sense of the invention any iterative function can be utilized to generate any type of desired sequencing of the "warble" and delays can be built into the timing circuit to interrupt the warble.

In the preferred embodiment of the invention, a frequency commencing at 21 kHz. and continuing until 24 kHz. immediately followed by a decrease in sequence from 24 kHz. to 21 kHz. has produced excellent results in dispersing animals an it is preferred. As indicated in the graphs, the frequency range from 19 to 24 kHz. has also been found to be effective. It is believed that alarm 10 will prove effective when operating within increasing sequences of frequency ranges of anywhere between 19 to 30 Khz. or any subrange within that range. The invention in its broader sense contemplates that there could be a delay between ascending and descending frequencies. That is a delay between shift times T1 can be built into the circuit or a delay can be built into the circuit after some predetermined shift times T1 have occurred. Perhaps more significantly, the software could be modified to include a concentration of wave forms at any given frequency which could find use depending on a specific application. For example, in a stationary application, certain animals may have a particular sensitivity to a specific series of ultrasonic sounds that other animals do not and it those animals which are to be prevented from entering into a certain, defined area. A warble siren effect could be constructed centered or at resonance at a particular frequency. For example, iterative time periods Tb and Tc could be constructed to have the same frequency. Again, test results have demonstrated that the continuous ascending and descending warble has been determined to be most effective for dispersing animals in a non-destructive manner and it is a specific inventive feature that the driver disclosed herein develops this warble.

FIG. 3 schematically illustrates by dash lines shown by reference numerals 90a, 90b, 90c, etc., the square wave form 83 generated at microprocessor's output pin RB7. For drawing clarity the iterative times Ta, Tb, etc., are shown as varying (when in fact the iterative times are relatively constant) so that only one wave form is shown. Because the operational amplifiers 50, 62 are operating in a Class "C" cycle, the base line voltage is shown as having some value, V0, with peak-to-peak voltage shown as 40 volts which is its value in the preferred embodiment. FIG. 3 shows the sinusoidal wave form 100 generated in transducer circuit 30 which is formed from square voltage wave form 83 generated in driver circuit 20.

Referring now to FIG. 4, the increasing - decreasing varying sequenced square voltage wave form 83 produced by microprocessor 75 is then amplified in transistor 95 which is an operational amplifier operating in a Class "C" operation or cycle as discussed above. The amplified, sequenced varying frequency wave form is then inputted to the primary side 32 of transformer 31. A capacitor 97 is connected to the opposite primary side 32 and to ground to complete the circuit.

Set forth below in tabular form is a description of each component illustrated in circuit diagrams FIG. 4 and 5 by part number and the supplier from whom the component can be purchased. As stated above, all circuit components are conventional.

| REF. NUM. | ITEM/ DESCRIPTION | PART NUMBER | SUPPLIER |
|---|---|---|---|
| 31 | TRANSFORMER | 3456-01 | TRANSFOMERS, INC. |
| 34 | CAPACITOR, .47 uf METALIZED POLYPROPYLENE | ARPM00474 15JHFBK22 | AEROVOX |
| 35 | RESISTOR, 15 ohm 5% SURFACE MOUNT | CRCW2010-150JRT1 | DALE |
| 36 | TRANSDUCER | KSN1075ENG | MOTOROLA |
| 39 | LED, RED | LTL-4211N | LITE-ON |
| 44 | POSITIVE VOLTAGE REGULATOR | MC78L05ABD | MOTOROLA |
| 45 | DIODE, SOD 87 | PRLL4001 | PHILLPS |
| 46 | CAPACITOR, 10 uf, 6.3 V, TANT | TAJB106M-006 | AVX |
| 50 | LOW POWER DUAL OPERATIONAL AMPLIFIER | LM258DT | SGS THOMPSON |
| 54, 56, 57 | RESISTOR, 10K, 5% | CR21-103F-T | KOS |
| 55 | RESISTOR, 3.3K, 1X | CR21-332F-T | KOS |
| 59, 60, 69, 78 | CAPACITOR, 33 pf, 50 v, 10% | 500R15H 103KVE | JOHANSON |
| 65, 77, 68 | RESISTOR, 10K, 5% | CR21-103J-T | KOA |
| 67 | RESISTOR, 1M, 5% | CR21-105J-T | KOA |
| 70 | MOTION SENSOR | KBS-20DA-7A | AVX |
| 75 | EPROM BASED 8-BIT | PIC16C54 | MICROCHIP |

-continued

| REF. NUM. | ITEM/DESCRIPTION | PART NUMBER | SUPPLIER |
|---|---|---|---|
| 80 | CMOS MICROCONTROLLER RESONATOR, 4.000 MHZ | PBRC-4.00AR | AVX |
| 81, 82 | CAPACITOR, 33 pf, 50 v, 10% | 500R15NV4E | JOHANSON |
| 94, 66 | RESISTOR, 180 ohm, 5% | CR21-181J-T | KOA |
| 95 | TRANSISTOR | MJF122 | MOTOROLA |
| 97 | CAPACITOR, .47 uf, 25 V, AL EL | 515D227M02 5BB6A | SPRAGUE |

The invention has been described with reference to a preferred embodiment. Obviously, modifications and alterations will occur to those skilled in the art upon reading the specifications hereof and understanding the invention. It is intended to include all such modifications and alterations insofar as they come within the scope of the present invention.

Having thus defined the invention, it is claimed:

1. A device for dispersing, in a non-destructive manner, animals capable of hearing sounds at ultrasonic frequencies, said device comprising:
   a) a sound transducer operable to generate sounds at ultrasonic frequencies;
   b) electrical means for electrically actuating said transducer to generate, in a sequential manner, at least first and second pluralities of sound waves at predetermined, varying ultrasonic frequencies, said electrical means generates said first pluralities of ultrasonic sound waves at varying frequencies for a predetermined first discrete time period followed by said second plurality of ultrasonic sound waves at varying frequencies for a second predetermined discrete time period, said first and second time periods being equal, whereby an ultrasonic warble effect of a siren is generated by said transducer to confuse and disperse said animal; and,
   c) a source of electrical power for actuating said electrical means.

2. A device for dispersing, in a non-destructive manner, animals capable of hearing sounds at ultrasonic frequencies, said device comprising:
   a) a sound transducer operable to generate sounds at ultrasonic frequencies;
   b) electrical means for electrically actuating said transducer to generate, in a sequential manner, at least first and second pluralities of sound waves at predetermined, varying ultrasonic frequencies, said electrical means generates said first pluralities of ultrasonic sound waves at varying frequencies for a predetermined first discrete time period followed by said second plurality of ultrasonic sound waves at varying frequencies for a second predetermined discrete time period, the time duration of said first plurality of ultrasonic waves produced by said transducer being about equal to the time duration of said second plurality of ultrasonic waves produced by said transducer and said time durations are predetermined at discrete time periods, whereby an ultrasonic warble effect of a siren is generated by said transducer to confuse and disperse said animal; and,
   c) a source of electrical power for actuating said electrical means.

3. The device of claim 1 wherein said electrical means generates a predetermined time delay between said first and second discrete time periods.

4. A device for dispersing, in a non-destructive manner, animals capable of hearing sounds at ultrasonic frequencies, said device comprising;
   a) a sound transducer operable to generate sounds at ultrasonic frequencies, said transducer being a piezo-electric transducer;
   b) electrical means for electrically actuating said transducer to generate, in a sequential manner, at least first and second pluralities of sound waves at predetermined, varying ultrasonic frequencies whereby an ultrasonic warble effect of a siren is generated by said transducer to confuse and disperse said animal, said electrical means includes means to generate constant peak-to-peak voltage levels as a continuous sine wave applied to said transducer whereby said transducer can emit sound levels at intensities correlated to said voltage levels higher than that possible with other voltage wave forms without over heating; and,
   c) a source of electrical power for actuating said electrical means.

5. A device for dispersing, in a non-destructive manner, animals capable of hearing sounds at ultrasonic frequencies, said device comprising;
   a) a sound transducer operable to generate sounds at ultrasonic frequencies;
   b) electrical means for electrically actuating said transducer to generate, in a sequential manner, at least first and second pluralities of sound waves at predetermined, varying ultrasonic frequencies, said electrical means to generate said sound waves further includes
   coupling transformer means for generating electrical current as sine wave voltages applied to said transducer;
   capacitor means in parallel with and sized with respect to said transformer means for supplying a continuous peak to peak sine wave voltage to said transducer, and
   driver means for supplying electrical current to the primary side of said transformer means at voltage wave frequencies correlated to said first and second ultrasonic frequencies, whereby an ultrasonic warble effect of a siren is generated by said transducer to confuse and disperse said animal; and,
   c) a source of electrical power for actuating said electrical means.

6. A device for dispersing, in a non-destructive manner, animals capable of hearing sounds at ultrasonic frequencies, said device comprising;

a) a sound transducer operable to generate sounds at ultrasonic frequencies;

b) electrical means for electrically actuating said transducer to generate, in a sequential manner, at least first and second pluralities of sound waves at predetermined, varying ultrasonic frequencies whereby an ultrasonic warble effect of a siren is generated by said transducer to confuse and disperse said animal, said electrical means to generate said sound waves includes (i) coupling transformer means for generating electrical current as sine wave voltages applied to said transducer;

(ii) capacitor means in parallel with and sized with respect to said transformer means for supplying a continuous peak to peak sine wave voltage to said transducer, said capacitor means includes a capacitor sized to be at resonance at the midpoint of the frequencies of said sine wave voltage, (iii) driver means for supplying electrical current to the primary side of said transformer means at voltage wave frequencies correlated to said first and second ultrasonic frequencies; and, c) a source of electrical power for actuating said electrical means.

7. The device of claim 6 wherein said driver means includes operational amplifier means for operating in a Class "C" amplifier cycle.

8. The device of claim 5 wherein said driver means includes microprocessor means for generating a plurality of electrical waves at sequentially varying frequencies and timing means operable in conjunction with said microprocessor means for periodically varying said frequencies from increasing to decreasing frequencies at discrete time periods.

9. The device of claim 8 wherein said timing means operates to cause said microprocessor means to generate a plurality of electrical pulses in a predetermined voltage wave form which sequentially increase in frequency from about 19 to about 24 kHz. and sequentially decrease in frequency from about 24 to about 19 kHz.

10. The device of claim 9 wherein said timing means causes said microprocessor means to switch said generation of said electrical waves from increasing frequencies to decreasing frequencies at about every 200 milliseconds.

11. A device for dispersing in a non-destructive manner, animals capable of hearing sounds at ultrasonic frequencies, said device comprising;

a) a sound transducer operable to generate sounds at ultrasonic frequencies;

b) electrical means for electrically actuating said transducer to generate, in a sequential manner, at least first and second pluralities of sound waves at predetermined, varying ultrasonic frequencies whereby an ultrasonic warble effect of a siren is generated by said transducer to confuse and disperse said animal, said electrical means to generate said sound waves further includes (i) coupling transformer means for generating electrical current as sine wave voltages applied to said transducer;

(ii) capacitor means in parallel with and sized with respect to said transformer means for supplying a continuous peak to peak sine wave voltage to said transducer, and (iii) driver means for supplying electrical current to the primary side of said transformer means at voltage wave frequencies correlated to said first and second ultrasonic frequencies, said driver means further includes microprocessor means for generating a plurality of predetermined electrical waves at sequentially varying frequencies and timing means operable in conjunction with said microprocessor means for periodically varying said frequencies from increasing to decreasing frequencies at discrete time periods, said timing means operates to cause said microprocessor means to generate a plurality of electrical pulses in a predetermined voltage wave form which sequentially increase in frequency from about 19 to about 24 kHz. and sequentially decrease in frequency from about 24 to about 19 kHz, said timing means causes said microprocessor means to switch said generation of said electrical waves from increasing frequencies to decreasing frequencies at about every 200 milliseconds, wherein the frequency of said predetermined electrical waves equals the frequency of said sound waves emitted by said transducer; and, c) a source of electrical power for actuating said electrical means.

12. The device of claim 5 wherein the resonant frequency of said transformer means and said capacitor means is about 22.5 kHz.

13. An electronic device for use in a motor vehicle to disperse, without injury, animals capable of hearing ultrasonic sounds, said device comprising:

a) driver means sequentially generating first and second electrical pulses in predetermined, voltage varying first and second electrical wave forms;

b) a coupling transformer receiving at its primary side said first and second electrical waves;

c) a capacitor in parallel with the secondary side of said transformer; and d) a piezo-electric transducer in parallel with said capacitor and said transformer for generating first and second varying pluralities of ultrasonic sounds correlated in wave length to said first and second electrical waves whereby said transducer generates periodically repeating varying ultrasonic sounds in the warble effect of a siren to confuse and disorient said animal whereby collision by said animal with said motor vehicle is avoided.

14. An electronic device for use in a motor vehicle to disperse, without injury, animals capable of hearing ultrasonic sounds, said device comprising:

a) driver means sequentially generating first and second electrical pulses in predetermined, voltage varying first and second electrical wave forms;

b) a coupling transformer receiving at its primary side said first and second electrical waves;

c) a capacitor in parallel with the secondary side of said transformer; and d) a piezo-electric transducer in parallel with said capacitor and said transformer for generating first and second varying pluralities of ultrasonic sound waves, correlated in wave length to said first and second electrical waves, said electrical wave forms having the same frequency as said ultrasonic sound waves produced by said ultrasonic piezo-electric transducer whereby said transducer generates periodically repeating varying ultrasonic sounds in the warble effect of a siren to confuse and disorient said animal whereby collision by said animal with said motor vehicle is avoided.

15. An electronic device for use in a motor vehicle to disperse, without injury, animals capable of hearing ultrasonic sounds, said device comprising:
   a) driver means sequentially generating first and second electrical pulses in predetermined, voltage varying first and second electrical wave forms;
   b) a coupling transformer receiving at its primary side said first and second electrical waves;
   c) a capacitor in parallel with the secondary side of said transformer; and,
   d) a piezo-electric transducer in parallel with said capacitor and said transformer for generating first and second varying pluralities of ultrasonic sound waves correlated in wave length to said first and second electrical waves, said frequencies of said electrical waves and said ultrasonic sound waves vary anywhere from about 19 kHz to about 30 kHz whereby said transducer generates periodically repeating varying ultrasonic sounds in the warble effect of a siren to confuse and disorient said animal whereby collision by said animal with said motor vehicle is avoided.

16. The device of claim 15 wherein said frequencies vary anywhere between about 20 kHz to about 25 kHz.

17. The device of claim 16 wherein said frequencies vary anywhere between about 21 to about 24 kHz.

18. An electronic device for use in a motor vehicle to disperse, without injury, animals capable of hearing ultrasonic sounds, said device comprising:
   a) driver means sequentially generating first and second electrical pulses in predetermined, voltage varying first and second electrical wave forms;
   b) a coupling transformer receiving at its primary side said first and second electrical waves;
   c) a capacitor in parallel with the secondary side of said transformer; and,
   d) a piezo-electric transducer in parallel with said capacitor and said transformer for generating first and second varying pluralities of ultrasonic sounds correlated in wave length to said first and second electrical waves, said first plurality of varying ultrasonic sounds are generated for a first discrete time period and said second plurality of varying ultrasonic sounds are generated for a second discrete time period whereby said transducer generates periodically repeating varying ultrasonic sounds in the warble effect of a siren to confuse and disorient said animal whereby collision by said animal with said motor vehicle is avoided.

19. The device of claim 18 wherein said first and second discrete time periods are equal to one another.

20. The device of claim 18 wherein said second plurality of ultrasonic sounds immediately follow said first ultrasonic sounds and said first plurality of ultrasonic sounds immediately follow said second plurality of ultrasonic sounds.

21. The device of claim 18 wherein said first plurality of ultrasonic sounds follow said second plurality of ultrasonic sounds after a third discrete delay period where no sound is transmitted.

22. An electronic device for use in a motor vehicle to disperse, without injury, animals capable of hearing ultrasonic sounds, said device comprising:
   a) driver means sequentially generating first and second electrical pulses in predetermined, voltage varying first and second electrical wave forms, said driver means includes operational amplifiers operating in a class C cycle;
   b) a coupling transformer receiving at its primary side said first and second electrical waves;
   c) a capacitor in parallel with the secondary side of said transformer; and,
   d) a piezo-electric transducer in parallel with said capacitor and said transformer for generating first and second varying pluralities of ultrasonic sounds correlated in wave length to said first and second electrical waves whereby said transducer generates periodically repeating varying ultrasonic sounds in the warble effect of a siren to confuse and disorient said animal whereby collision by said animal with said motor vehicle is avoided.

23. An electronic device for use in a motor vehicle to disperse, without injury, animals capable of hearing ultrasonic sounds, said device comprising:
   a) driver means sequentially generating first and second electrical pulses in predetermined, voltage varying first and second electrical wave forms, said driver means produces said predetermined voltage wave forms as square waves;
   b) a coupling transformer receiving at its primary side said first and second electrical waves;
   c) a capacitor in parallel with the secondary side of said transformer; and,
   d) a piezo-electric transducer in parallel with said capacitor and said transformer for generating first and second varying pluralities of ultrasonic sounds correlated in wave length to said first and second electrical waves whereby said transducer generates periodically repeating varying ultrasonic sounds in the warble effect of a siren to confuse and disorient said animals whereby collision by said animal with said motor vehicle is avoided.

24. The device of claim 23 wherein said driver means includes operational amplifiers means for generating said wave forms and microprocessor means for generating a plurality of electrical waves at sequentially varying frequencies and timing means operable in conjunction with said microprocessor means for periodically varying said frequencies from increasing to decreasing at discrete time periods.

25. The device of claim 24 wherein said timing means operates to cause said microprocessor means to generate a pulse of electrical waves which sequentially increase from about 19 to about 24 kHz. and sequentially decrease from about 24 to about 19 kHz.

26. The device of claim 25 wherein said timing means causes said microprocessor means to switch said generation of said electrical waves from increasing frequencies to decreasing frequencies at about every 200 milliseconds.

27. In a motor vehicle, an anti-collision, ultrasonic sounding alarm preventing animals capable of detecting ultrasonic sounds from colliding with said motor vehicles, said alarm comprising:
   a) means from said vehicle to provide a source of electrical power from said vehicle's battery to actuate said alarm;
   b) electrical driver means for converting said electrical power into a plurality of electrical pulses having voltage wave forms of sequenced, varying frequencies; and,
   c) piezo-electric transducer means receiving said electrical pulses and in response thereto generating ultrasonic sound waves at the varying sequenced frequencies of said voltage wave forms, said transducer means further including
i) a coupling transformer;
ii) a capacitor in parallel with said transformer, and an
iii) ultrasonic sound generating piezo-electric transducer in parallel with said transformer, said ultrasonic sound waves sequenced to simulate the warble effect of a siren whereby said animal, hearing said ultrasonic siren simulated sound, becomes confused and disoriented.

28. The alarm of claim 27 further including said driver means controlling the generating of a first sequence of voltage wave forms having increasing frequencies followed by a second sequence of voltage wave forms having decreasing frequencies so that said transducer means produces a first series of ultrasonic sound waves for a first fixed time duration having increasing frequencies immediately followed by a second series of ultrasonic sound waves having decreasing frequencies for a second fixed time duration.

29. The alarm of claim 28 wherein said driver means is further effective to cause a delay for a third fixed time period after said second series of sound waves have been emitted and prior to emitting said first ultrasonic series of sound waves.

30. The alarm of claim 29 wherein said first and second time periods are equal.

31. In a motor vehicle, an anti-collision, ultrasonic sounding alarm preventing animals capable of detecting ultrasonic sounds from colliding with said motor vehicles, said alarm comprising:
a) means from said vehicle to provide a source of electrical power from said vehicle's battery to actuate said alarm;
b) electrical driver means for converting said electrical power into a plurality of electrical pulses having first and second voltage wave forms of sequenced, varying frequencies; and,
c) piezo-electric transducer means receiving said electrical pulses and in response thereto generating ultrasonic sound waves at the varying sequenced frequencies of said first and second voltage wave forms, said transducer means further including
i) a coupling transformer;
ii) a capacitor in parallel with said transformer, said capacitor sized to be at resonant frequency at the mid-point of the frequencies of said first and second voltage wave forms, and
iii) an ultrasonic sound generating piezo-electric transducer in parallel with said transformer, said ultrasonic sound waves sequenced to simulate the warble effect of a siren whereby said animal, hearing said ultrasonic siren simulated sound, becomes confused and disoriented.

32. In a motor vehicle, an anti-collision, ultrasonic sounding alarm preventing animals capable of detecting ultrasonic sounds from colliding with said motor vehicle, said alarm comprising:
a) means from said motor vehicle to provide a source of electrical power from said vehicle's battery to actuate said alarm;
b) electrical driver means for converting said electrical power into a plurality of first and second electrical pulses having voltage wave forms of sequenced, varying frequencies, said driver means including operational amplifiers operating in a Class C cycle and microprocessor means for combining, timing and regulating the output of said operational amplifiers to produce said first and second pulses in a varying sequential manner inputted to said transformer, said operational amplifiers being square wave generating operational amplifiers; and,
c) piezo-electric transducer means receiving said electrical pulses and in response thereto generating ultrasonic sound waves at the varying sequenced frequencies of said voltage wave forms, said ultrasonic sound waves sequenced to simulate the warble effect of a siren whereby said animal, hearing said ultrasonic siren simulated sound, becomes confused and disoriented.

33. In a motor vehicle, an anti-collision, ultrasonic sounding alarm preventing animals capable of detecting ultrasonic sounds from colliding with said motor vehicles, said alarm comprising:
a) means from said vehicle to provide a source of electrical power from said vehicle's battery to actuate said alarm;
b) electrical driver means for converting said electrical power into a plurality of electrical pulses having voltage wave forms of sequenced, varying frequencies, said driver means comprises a circuit, said circuit including a motion detector, said motion detector shorting said circuit in the absence of vibrations imparted thereto from movement of said vehicle or vibrations from the operating engine thereof; and,
c) piezo-electric transducer means receiving said electrical pulses and in response thereto generating ultrasonic sound waves at the varying sequenced frequencies of said voltage wave forms, said ultrasonic sound waves sequenced to simulate the warble effect of a siren whereby said animal, hearing said ultrasonic siren simulated sound, becomes confused and disoriented.

34. In a motor vehicle, an anti-collision, ultrasonic sounding alarm preventing animals capable of detecting ultrasonic sounds from colliding with said motor vehicles, said alarm comprising:
a) means from said vehicle to provide a source of electrical power from said vehicle's battery to actuate said alarm;
b) electrical driver means for converting said electrical power into a plurality of electrical pulses having voltage wave forms of sequenced, varying frequencies;
c) piezo-electric transducer means receiving said electrical pulses and in response thereto generating ultrasonic sound waves at the varying sequenced frequencies of said voltage wave forms, and further comprising an ultrasonic sound generating circuit, said ultrasonic sound waves sequenced to simulate the warble effect of a siren whereby said animal, hearing said ultrasonic siren simulated sound, becomes confused and disoriented; and
d) said driver means comprises a circuit, said circuit including a low battery detector circuit, said low battery detector circuit operational to disarm said ultrasonic sound generating circuit when said motor vehicle's battery is discharged.

35. The alarm of claim 27 wherein said transducer means includes a light emitting diode which is actuated when said transducer means are operational.

36. A method for preventing animals from running into the path of an oncoming vehicle comprising the steps of:

providing an electronic driver powered by the vehicle's battery for generating a first plurality of voltage wave forms having increasing frequencies followed by a second plurality of voltage wave forms having decreasing frequencies;

providing said vehicle with a piezo-electric transducer capable of producing ultrasonic sounds; and, inputting said voltage wave forms to said transducer to cause said transducer to emit a first plurality of ultrasonic sounds sequenced to having increasing frequencies followed by a second plurality of ultrasonic sounds in a sequence of decreasing frequencies whereby the warble effect of a siren is created to cause said animal to avoid moving into the path of said vehicle, said driver produces a square voltage wave form and said method includes the additional steps of providing a transformer converting said square wave into a sinusoidal wave form and inputting said sinusoidal wave to said transducer to cause said transducer to emit intense sounds without overheating.

* * * * *